US009558262B2

(12) United States Patent
Zhang et al.

(10) Patent No.: US 9,558,262 B2
(45) Date of Patent: Jan. 31, 2017

(54) SORTING METHOD OF DATA DOCUMENTS AND DISPLAY METHOD FOR SORTING LANDMARK DATA

(71) Applicant: VIA Technologies, Inc., New Taipei (TW)

(72) Inventors: Guo-Feng Zhang, Shanghai (CN); Yi-Fei Zhu, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 231 days.

(21) Appl. No.: 14/271,458

(22) Filed: May 7, 2014

(65) Prior Publication Data
US 2015/0012549 A1    Jan. 8, 2015

(30) Foreign Application Priority Data

Jul. 2, 2013 (CN) .......................... 2013 1 0273224
Jul. 2, 2013 (CN) .......................... 2013 1 0273231

(51) Int. Cl.
G06F 17/30     (2006.01)

(52) U.S. Cl.
CPC ..... G06F 17/30675 (2013.01); G06F 17/3087 (2013.01)

(58) Field of Classification Search
USPC ............................ 707/723, 752, 737; 706/12
See application file for complete search history.

(56) References Cited

U.S. PATENT DOCUMENTS

| 8,943,071 B2* | 1/2015 | Bishop | G06F 17/30011 707/737 |
| 8,990,241 B2* | 3/2015 | Wu | G06F 17/3064 707/752 |
| 2005/0144162 A1* | 6/2005 | Liang | G06F 17/30109 |
| 2007/0288451 A1* | 12/2007 | Meyer | G06F 17/30616 |
| 2007/0288490 A1* | 12/2007 | Longshaw | G06F 11/1471 |
| 2010/0208984 A1* | 8/2010 | Bilenko | G06Q 30/0256 382/161 |
| 2011/0131157 A1* | 6/2011 | Iyer | G06Q 30/0251 706/12 |

(Continued)

FOREIGN PATENT DOCUMENTS

| TW | 201030540 | 8/2010 |
| TW | 201248434 | 12/2012 |

OTHER PUBLICATIONS

"Office Action of Taiwan Counterpart Application," issued on Mar. 13, 2015, p. 1-p. 13.

Primary Examiner — Hung T Vy
(74) Attorney, Agent, or Firm — Jianq Chyun IP Office

(57) ABSTRACT

A sorting method of data documents is provided, adapted to an electronic device. The sort method includes the following steps: retrieving a plurality of keywords from contents of a plurality of data documents; retrieving corresponding keyword rankings of the plurality of keywords by a search engine; searching corresponding keyword categories of the plurality of keywords; and generating a sort algorithm based on the plurality of keywords, the keyword ranking and the keyword category of each of the plurality of keywords, and a current ranking of each of the plurality of data documents, wherein the sort algorithm is used to calculate a predicting ranking of another data document and to sort the another data document.

6 Claims, 14 Drawing Sheets

(56) References Cited

U.S. PATENT DOCUMENTS

| | | |
|---|---|---|
| 2013/0066750 A1 | 3/2013 | Siddique et al. |
| 2013/0137464 A1 | 5/2013 | Kramer et al. |
| 2013/0159298 A1* | 6/2013 | Mason .............. G06F 17/30867 707/728 |
| 2014/0244633 A1* | 8/2014 | Taank ............... G06F 17/30864 707/723 |

* cited by examiner

SORTING METHOD OF DATA DOCUMENTS AND DISPLAY METHOD FOR SORTING LANDMARK DATA

CROSS-REFERENCE TO RELATED APPLICATION

This application claims the priority benefits of China application serial no. 201310273231.5, filed on Jul. 2, 2013, and China application serial no. 201310273224.5, filed on Jul. 2, 2013. The entirety of each of the above-mentioned patent applications is hereby incorporated by reference herein and made a part of specification.

BACKGROUND OF THE INVENTION

Field of the Invention

The invention relates to a data processing method, and particularly to a sorting method of data documents and a display method for sorting landmark data.

Description of Related Art

With recent advance in technology, the Internet has become an indispensable medium for obtaining information to people nowadays. Especially, with the development and popularization of network news, not only paper can be replaced to meet the current trend of environment protection, news messages can also be updated instantly in response to the rapidly changing events.

In the era of information explosion, massive amount of the network news can cause inconvenience for users in reading and searching said messages. In order to quickly retrieve important information for the users, a manual editing is usually adopted for sorting top news in network news industry. This is not only time consuming, objectivity in a sorting order of top news may be lost owing to subjective factors from the manual editing.

However, since news contents include complex data messages, it is not easy for a machine to perform an automatic process for the sorting order.

SUMMARY OF THE INVENTION

The invention is directed to a sorting method of data documents, capable of generating a forecast model of sorted result by analyzing contents of the data documents with known sorted result, so that a loading of sorting the data documents with manual editing can be reduced, or subjective factors from the manual editing when sorting the data documents can be avoid.

The invention provides a sorting method of data documents adapted to an electronic device. The sorting method includes the following steps. A plurality of keywords are retrieved from contents of a plurality of data documents. Keyword rankings corresponding to the plurality of keywords are retrieved by a search engine. Keyword categories corresponding to the plurality of keywords are searched. And, a sort algorithm is generated based on the plurality of keywords, the keyword ranking and the keyword category of each of the plurality of keywords, and a current ranking of each of the plurality of data documents. The sort algorithm is used to calculate a predicting ranking of another data document and to sort the another data document.

The invention provides a sorting method of data documents, adapted to an electronic device, and the sorting method includes the following steps. At least one first keyword are retrieved from a content of a first data document. A keyword ranking corresponding to the at least one first keyword are retrieving by a search engine. A keyword category corresponding to the at least one first keyword are searched. And, at least one first keyword, the keyword ranking and the keyword category of each of the at least one first keyword are inputted into a sort algorithm thereby a predicting ranking of the first data document is outputted to sort the first data document, wherein the sort algorithm is generated based on contents of a plurality of second data documents and a current ranking of each of the plurality of second data documents.

The invention provides a display method for sorted landmark data adapted to a server and an electronic device communicated to each other. The display method comprises the following steps. An address corresponding to each of a plurality of landmark data documents are retrieved from contents of the plurality of landmark data documents. An address quoting frequency of the address of each of the plurality of landmark data on the Internet are counted. An objective level category of each of the plurality of landmark data are searched. A publicity of each of the plurality of landmark data are calculated based on the objective level category of each of the plurality of landmark data and the address quoting frequency. And, the landmark data on the electronic device are displayed based on the publicity of each of the plurality of landmark data.

The invention provides a display method for sorted landmark data adapted to an electronic device, and the display method comprises the following steps. A place name keyword is received. It is searched that whether at least one landmark data is corresponding to the place name keyword. If the at least one landmark data is searched, the at least one landmark data is sorted based on a publicity, a conformity and a distance fraction of each of the at least one landmark data. And, the sorted at least one landmark data is displayed on the electronic device, wherein the publicity of each of the at least one landmark data is related to an objective level category of each of the at least one landmark data, and an address quoting frequency counted on the Internet.

In summary, the invention can be used to generate the sort algorithm based on the keyword, the keyword ranking, the keyword category in the data documents, and known current rankings of data documents. The sort algorithm is used to calculate the predicting ranking of another data document and to sort the another data document.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
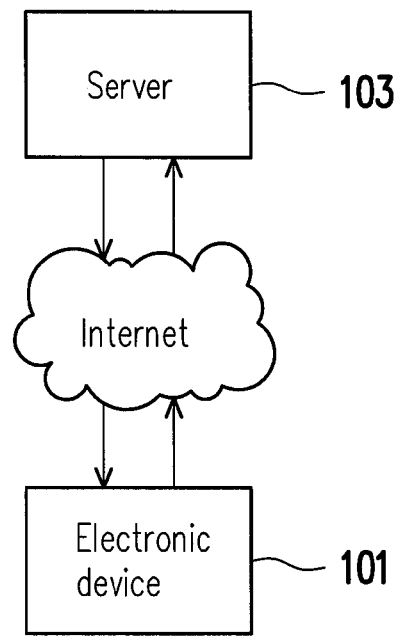
FIG. 1 is a block diagram illustrating an electronic device and a server according to a plurality of embodiments of the invention.

FIG. 1 is a block diagram illustrating an electronic device 101 and a server 103 according to an embodiment of the invention. The server 103 may be a personal computer, a working station, a host computer, or other computers or processors in various types. The electronic device 101 may be a notebook computer, a tablet computer, a personal digital assistant, a smart phone, or other portable electronic devices in various types. The electronic device 101 communicates with the server 103 via a network. In the present embodiment, a message notifying device 200 is utilized as the electronic device 101 for example. In other words, the electronic device 101 and the message notifying device 200 are substantially equivalent and interchangeable to each other.

In case a user intends to set a desired information type for the message notifying device 200, the user can send a request message by the message notifying device 200. For instance, the request message can be "notify me immediately of the latest news regarding the nuclear catastrophe in Japan", "notify me immediately if there is a stock change exceeding 2% among my selected stocks", or "notify me immediately when the result of the 36th lottery is announced". In the present embodiment, the user may input the request message to the message notifying device 200 by speech recognition. The message notifying device 200 can determine any possible intentions of the request message by using a natural language processing module in various types, or a retrieving process can be further performed on a structured database stored with great amount of words thereby determining a property of keywords being retrieved. After the request message is analyzed and comprehended, a corresponding command condition can be obtained, and the command condition can be transmitted to the server 130. For instance, the command condition may be "there is an update of the latest news regarding the nuclear catastrophe in Japan", "a specific stock change has gone up for 2%" or "the result of the 36th lottery is announced". The server 103 then inquires whether a corresponding prompt message is available, such as "contents of the latest news regarding the nuclear catastrophe in Japan", "the share price of the specific stock" or "winning numbers of the 36th lottery". In the present embodiment of the invention, the request message can be analyzed and comprehended by the message notifying device 200. In another embodiment of the invention, the message notifying device 200 can transmit the request message to the server 103, so that any possible intentions of the request message can be determined by using the natural language processing module in various types in the server 103. Or, the retrieving process can be performed on the structured database stored with great amount of words so as to determine the property of keywords being retrieved, such that the keywords being retrieved can then be analyzed and comprehended. After the server 103 has inquired whether the corresponding prompt message satisfying the command condition is available, if it is determined that the corresponding prompt message satisfying the command condition is available, the message notifying device 200 can then download and store the corresponding prompt message and play the corresponding prompt message. In the present embodiment of the invention, since a latest information of the desired information type (which is set by the user) is recorded regularly (or immediately) by the server 103, the corresponding prompt message can be inquired whenever the command condition is received. Therefore, in comparison with the latest information of the desired information type (which is set by the user) being recorded regularly (or immediately) by the message notifying device 200, the invention can further reduce power consumption and work loading of the message notifying device 200.

In the present embodiment, the server 103 can inquire the corresponding prompt message satisfying the command condition within a specific time interval. Said specific time interval can be a specific time interval set by the user, or a time interval when the user is away from the message notifying device 200. For instance, the user may leave the message notifying device 200 on table due to factors such as bathing or forgot to bring it; after passing the specific time interval, the user may return to the table and pick up the message notifying device 200 once again. In this case, since there may be an update of the latest information of the desired information type set by the user occurs while the user was away from the message notifying device 200, the message notifying device 200 can download and store the corresponding prompt message from the server 103, in correspondence to a start time and an end time of the specific time interval, and to be played to notify the user. Detailed description thereof is further provided as below.

Figure 2:
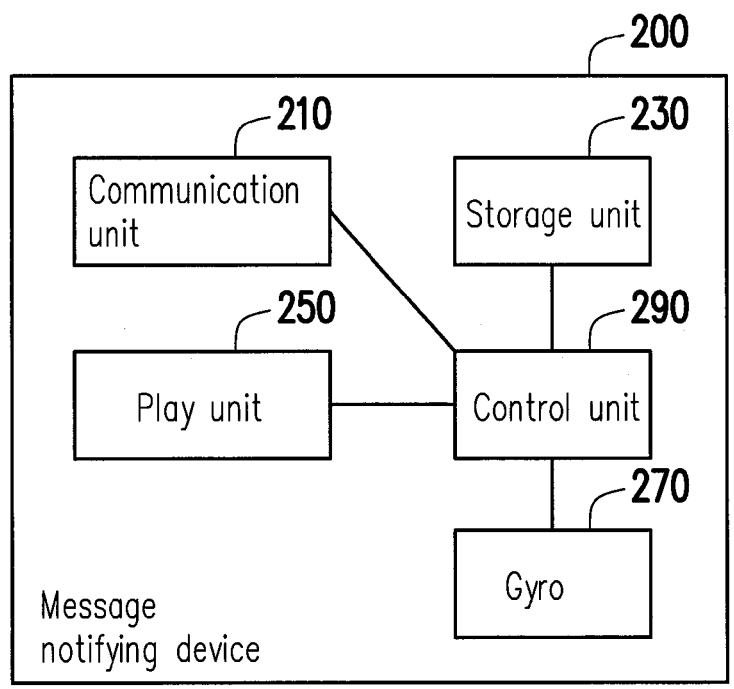
FIG. 2 is a block diagram illustrating a message notifying device according to an embodiment of the invention.
Figure 3:
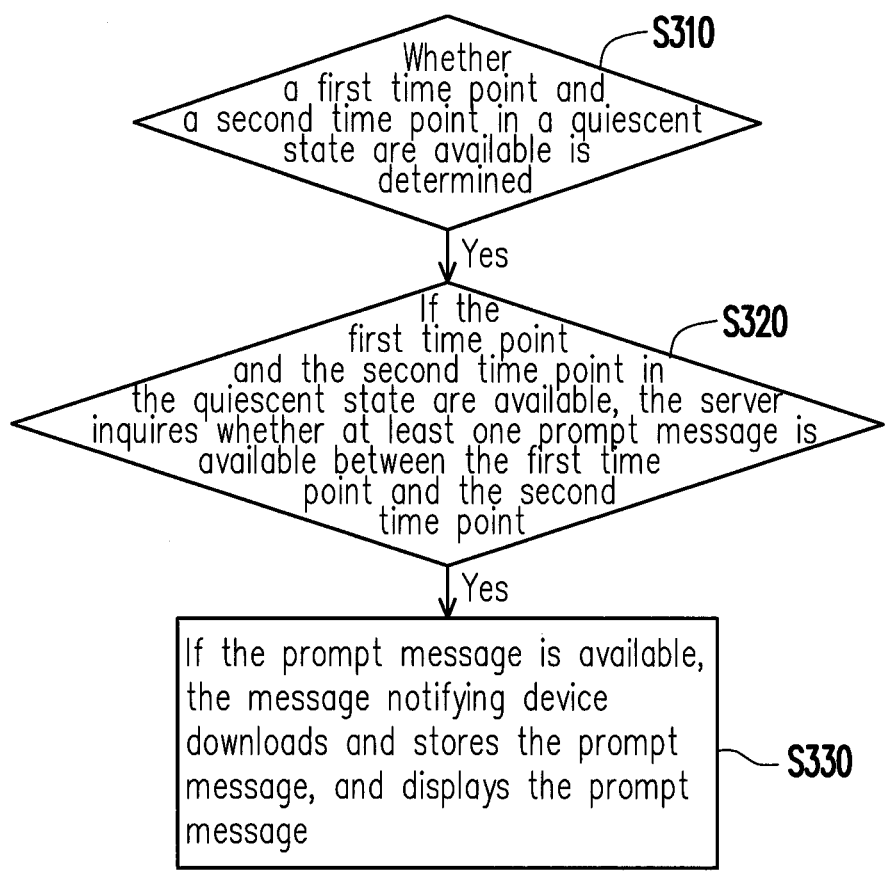
FIG. 3 is a flowchart illustrating a message notifying method according to an embodiment of the invention.

FIG. 2 is a block diagram of a message notifying device according to an embodiment of the invention. As shown in FIG. 2, the message notifying device 200 includes a communication unit 210, a storage unit 230, a play unit 250, a gyro 270 and a control unit 290. The control unit 290 is coupled to the communication unit 210, the storage unit 230, the play unit 250 and the gyro 270. The communication unit 210 is configured to communicate with the server 103; the storage unit 230 is configured to store data; the play unit 250 is configured to play a message; and the gyro 270 is configured to detect an angular velocity of the message notifying device 200. The communication unit 210 can be a wireless communication chip or a wireless communication module, or can be a chip or a module having Internet connectivity. The storage unit 230 can be a data storage medium in various types. The play unit 250 can be a data playing device such a speaker, a display, or other data output devices. The control unit 290 can be a functional module, a chip and a microprocessor, in various types. FIG. 3 is a flowchart illustrating a message notifying method according to an embodiment of the invention. As shown in FIG. 3, the message notifying method according to the present embodiment of the invention includes steps S310 to S330. Referring to FIGS. 2 and 3 simultaneously.

In step S310, the control unit 290 determines whether a first time point (i.e., the start time as described above) is available in which the message notifying device 200 starts to enter a quiescent state, and whether a second time point (i.e., the end time as described above) is provided in which the message notifying device 200 ends the quiescent state. For instance, the user may leave the message notifying device 200 on table due to factors such as bathing or forgot to bring it. Accordingly, the message notifying device 200 enters the quiescent state at the first time point. In this case, the control unit 290 can record the first time point in the storage unit 230. After the specific time interval, the user may return to the table and pick up the message notifying device 200 once again. Accordingly, the message notifying device 200 ends the quiescent state at the second time point. In this case, the control unit 290 can also record the second time point in the storage unit 230. The control unit 290 can determine whether the first time point and the second time point are available by inquiring the storage unit 230.

In step S320, if the control unit 290 determines that the first time point and the second time point are available, the server 130 then inquires whether at least one prompt message is available between the first time point and the second time point. For instance, if the control unit 290 determines that the first time point and the second time point are available, it indicates that the user has been away from the message notifying device 200 for a period of time. In this case, the control unit 290 transmits the first time point and the second time point to the server 103 for inquiring, so as to determine whether a prompt message is available within the period of time. For example, if a missed call or an unread message occurs in the period of time, the prompt message can be "you have a missed call" or "you have an unread message". The prompt message can also be the desired information set by the user such as top news, stock or lottery.

In step S330, if at least one prompt message is available in the server 103, the message notifying device 200 downloads and stores the at least one prompt message in the storage device 230, so that the play unit 250 can display the at least one prompt message. For instance, if the missed call or the unread message occurs, or if the information set by the user such as top news, stock or lottery is available, between the first time point and the second time point when the user is away, the message notifying device 200 can download and store the prompt messages of "you have a missed call" or "you have an unread message", or specific information regarding top news, the stock or lottery, in the storage device 230 and to be played by the play device 250. In this embodiment of the invention, a prompt message playing method of the display device 250 includes playing texts or playing images, but the invention is not limited thereto.

Figure 4:
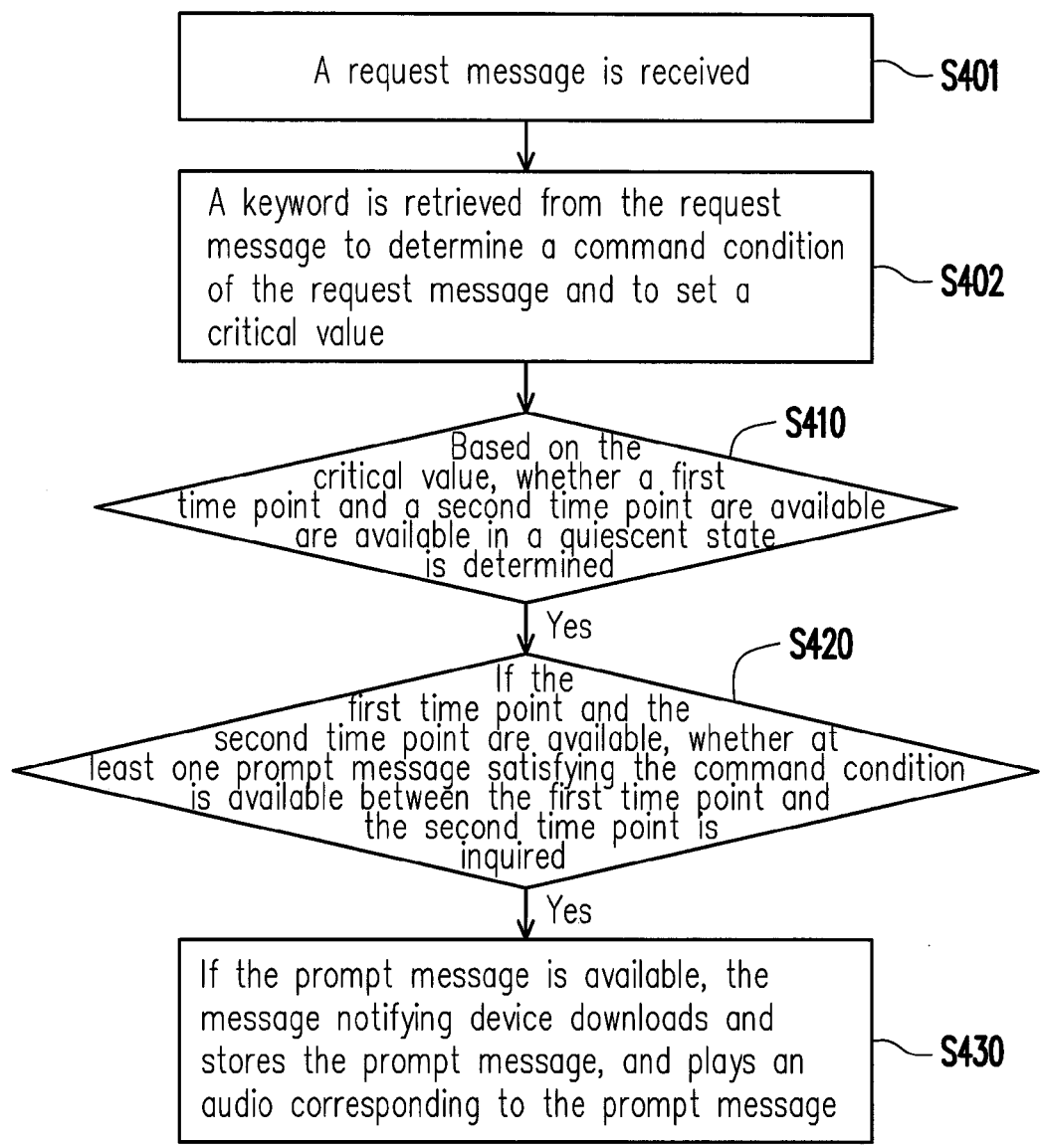
FIG. 4 is a flowchart illustrating a message notifying method according to another embodiment of the invention.

FIG. 4 is a flowchart illustrating a message notifying method according to another embodiment of the invention. As shown in FIG. 4, the message notifying method according to the present embodiment of the invention includes steps S401, S402, S410, S420 and S430. Referring to FIGS. 2 and 4 together.

In step S401, the user can send a request message by the message notifying device 200. For instance, the request message from the user can be "notify me immediately of the latest news regarding the nuclear catastrophe in Japan", "notify me immediately if there is a stock change exceeding 2% among my selected stocks", or "notify me immediately when the result of the 36th lottery is announced". As described above, in the present embodiment, the user can input the request message to the message notifying device 200 by speech recognition. In another embodiment of the invention, the user can also input the request message by using a specific software interface or various other methods, but the invention is not limited thereto.

In step S402, at least one keyword is retrieved from the request message to determine a command condition of the request message and to set a critical value. In the present embodiment, the keyword of the request message can be retrieved by the control unit 290 so as to be analyzed and comprehended by the control unit 290. In another embodiment of the invention, the request message can be transmitted to the server 103, and the keyword of the request message can be retrieved in the server 103 so as to be analyzed and comprehended. The keyword can be a type of the desired information set by the user, a wording for expressing a command, or other predefined wording to be analyzed and comprehended. In the present embodiment, the control unit 290 can determine any possible intentions of the request message by using the natural language processing module of various types, or the retrieving process can be performed on the structured database stored with great amount of words so as to determine the property of keywords being retrieved. Accordingly, the retrieved keyword can be analyzed and comprehended so as to obtain the corresponding command condition from the request message, such as whether there is an update of the a latest news regarding the nuclear catastrophe in Japan, whether a specific stock change has gone up for 2% or whether a result of the 36th lottery is announced. In addition, the critical value can be obtained by the control unit 290 with a result analyzed and comprehended from the keyword to be used in step S410.

In step S410, the control unit 290 determines, based on the critical value, whether a first time point is available in which the message notifying device 200 starts to enter a quiescent state, and whether a second time point is available in which the message notifying device 200 ends the quiescent state. The critical value can be a timing critical value or an angular velocity critical value. In the present embodiment, the control unit 290 can detect an angular velocity of the message notifying device 200 by the gyro 270, so as to determine whether the message notifying device 200 enters the quiescent state or ends the quiescent state, thereby obtaining the first time point and the second time point. For instance, when the angular velocity of the message notifying device 200 is less than the angular velocity critical value, the control unit 290 can determine that the message notifying device 200 has entered the quiescent state. Whereas when the angular velocity of the message notifying device 200 is less than the angular velocity critical value while a duration thereof exceeds the timing critical value, the control unit 290 can determine that the user is away from the message notifying device 200, and set the first time point as to this time point. Later on, when the angular velocity of the message notifying device 200 is greater than or equal to the angular velocity critical value, the control unit 20 can determine that the message notifying device 200 has ended the quiescent state (i.e., entering to a moving state). In other words, the control unit 290 can determine that the user has picked up the message notifying device 200 once again, and set the second time point as to this time point. As described above, the first time point and the second time point can be recorded in the storage unit 230. In the present embodiment, if the message notifying device 200 includes a vibration mode (e.g., when an incoming call or a text message is available, the message notifying device 200 then enters the vibration mode), the angular velocity critical value can be greater than the angular velocity caused by the message notifying device 200 under the vibration mode. Accordingly, the control unit 290 will not determine that the message notifying device 200 under the vibration mode has entered to the moving state. In another embodiment of the invention, the control unit 290 can determine whether the message notifying device 200 has entered or ended the quiescent state by determining whether the message notifying device 200 enters the quiescent state or whether a touch input signal is received by the message notifying device 200.

In step S420, if the control unit 290 determines that the first time point and the second time point are available, the server 130 can then inquire whether at least one prompt message satisfying the command condition is available between the first time point and the second time point. For instance, when "there is an update of the latest news regarding the nuclear catastrophe in Japan", "a specific stock change has gone up for 2%" or "a result of the 36th lottery is announced" being occurred within the specific time interval between the first time point and the second time point, the prompt message is available in the server 103. In the present embodiment, the prompt message can be contents corresponding to the latest information of the desired information type set by the user, such as "contents of the latest news regarding the nuclear catastrophe in Japan", "a share price of the specific stock" or "winning numbers of the 36th lottery". In another embodiment of the invention, the prompt message can also be a message that prompts the user about the contents of the latest information of the desired information type set by the user, such as "please be informed that a latest news regarding the nuclear catastrophe in Japan is available now", "dear user, your share price of the specific stock has gone up dramatically" or "the winning numbers of the 36th lottery is available now".

In step S430, if at least one prompt message is available in the server 103, the message notifying device 200 downloads and stores the at least one prompt message in the storage device 230, and plays an audio corresponding to the at least one prompt message by the play unit 250. For instance, if the control unit 290 determines that the prompt message is available, such as "contents of the latest news regarding the nuclear catastrophe in Japan", "a share price of the specific stock" or "winning numbers of the 36th lottery", said prompt message is downloaded and stored in the storage unit 230 to be played by the play unit 250. In the present embodiment, the play unit 250 can play the contents of the prompt message in audio.

In view of above, the invention is capable of receiving the request message input by the user by voice, and the keyword thereof is retrieved for determining the command condition and setting the critical value. When the user is away from the message notifying device, the critical value can be used to detect the first time point in which the message notifying device enters the quiescent state, and the second time point in which the quiescent state is ended. Later, when the user picks up the message notifying device once again, the prompt message satisfying the command condition can be inquired in the server, and the prompt message can be downloaded and stored to the message notifying device. As a result, the prompt message can be played in audio so as to remind the user, such that a probability of ignoring important message can be lowered.

An embodiment from another technical view point to be implemented is provided as below, and served to describe operations between the electronic device 101 and the server 103. As shown in FIG. 1, in another embodiment of the invention, the electronic device 101 and the server 103 can also be used to execute a display method of a landmark data.

In the present embodiment of the invention, the user can input a place name keyword in order to search a specific landmark by the electronic device 101. Next, the electronic device 101 can transmit the place name keyword to the server 103, so that the server 103 can search for the place name keyword. Subsequently, the landmark data being searched is then sorted, so that the landmark data which satisfies the most of what user demands in the search can have a higher place in a sorting order. Lastly, the server transmits a sorting result of the landmark data back to the electronic device 101 for displaying, so that the user may find the most useful information therein. Subsequently, in the present embodiment, the electronic device 101 can display a landmark name of each of the landmark data from the sorting result by using a map application. In another embodiment of the invention, the electronic device 101 is capable of searching a specific place name and sorting the searched landmark data. Therefore, the electronic device 101 can display the sorting result of the landmark data to the user without going through the server 103.

The landmark data can have specific characterized parameters. For instance, different landmark data can include different publicities. Accordingly, a corresponding order can be generated during a process of sorting the landmark data. Therefore, in the present embodiment of the invention, before the user inputs the place name keyword in order to search the specific landmark, the server 103 can perform calculations for existing landmark data. Detailed description thereof is provided as below.

Figure 5:
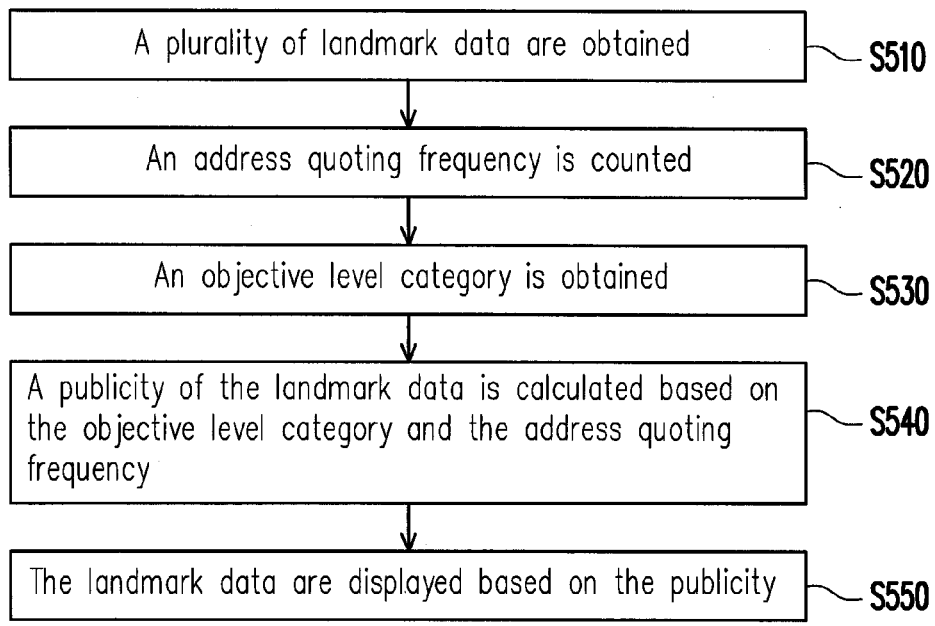
FIG. 5 is a flowchart illustrating a display method of landmark data according to an embodiment of the invention.

FIG. 5 is a flowchart of a display method of landmark data according to an embodiment of the invention. Table 1 is a schematic diagram of the landmark data according to an embodiment of the invention. As shown in FIG. 5, the display method of landmark data according to an embodiment of the invention includes steps S510 to S550. As shown in Table 1, the landmark data can include a landmark name, an objective level category, an address, an address quoting frequency, and a publicity being calculated correspondingly. The following description refers to FIG. 5 and Table 1 together.

TABLE 1

| Landmark data | Landmark name | Objective level category | Address | Address quoting frequency | Publicity |
|---|---|---|---|---|---|
| 1 | The Oriental Pearl | Class 4A | 1, Century Avenue, Pudong District, Shanghai City | 852318 | 113.94 |

TABLE 1-continued

| Landmark data | Landmark name | Objective level category | Address | Address quoting frequency | Publicity |
|---|---|---|---|---|---|
| 2 | The Oriental Pearl | Shop | 9F of Arts and Crafts Building, 31, Beijing East Road, Xuanwu District, Shanghai City | 69 | 33.4 |
| 3 | Shanghai Wild Animal Park | Class 3A | 178, South Sixth Highway, Pudong Nanhui District, Shanghai City | 7501 | 77.54 |
| 4 | Hukou Waterfall | Class 4A | Linfen City, Shanxi Province . . . | 3236 | 80.49 |
| 5 | Hukou Waterfall grand hotel | Three Star | 18, Prospect Road, Hukou Waterfall Area, Ji County, Shanxi Province | 713 | 63.42 |
| 6 | South Beauty Restaurant | Two Star | 51-7, West Street, Tiananmen Square, Xicheng District, Beijing City | 52024 | 81.16 |
| 7 | South Beauty Decoration | Shop | 135, North Road, Industrial Park, Jiugong Town, Daxing District, Beijing City | 293 | 42.08 |
| 8 | South Beauty Industry | Shop | 37, Jinshan Road, Mudu Town, Wuzhong District, Suzhou City | 531 | 45.66 |
| 9 | South Bride Media | Shop | No. 9 of District 10, 188, South Fourth Ring Road, Fengtai District, Beijing City | 1023 | 49.58 |
| 10 | Beijing Hualian Hypermarket | Market | 5F, No. 515 of East Tower Sichuan Building, 1 Fu Wai Avenue, Xicheng District, Beijing City | 5236 | 83.38 |
| 11 | McDonald's | Shop | 5F, No. 515 of East Tower Sichuan Building, 1 Fu Wai Avenue, Xicheng District, Beijing City | 5236 | 59.38 |
| 12 | 217 | National Highway | X | X | 36 |
| 13 | 373 | Province Highway | X | X | 24 |
| 14 | 048 | Country Highway | X | X | 12 |

In step S510, a plurality of landmark data are obtained. For instance, the server 103 can obtain the plurality of landmark data by a database or a search engine, but the invention is not limited thereto. The plurality of landmark data obtained can be stored in a specific storage medium and served as a landmark database.

In step S520, the address quoting frequency of the address of each of the plurality of landmark data on the Internet is counted. For instance, through the search engine, the server 103 can be informed of the address of "The Oriental Pearl" being "1, Century Avenue, Pudong District, Shanghai City" has been quoted for 852318 times on the Internet. Since the landmark name has a high arbitrariness, a great error may occur if a quoting frequency of the landmark name of the landmark data is used as a characterized parameter corresponding to the publicity instead of the address quoting frequency. For instance, when counting the characterized parameter of the publicity for the address of a shop "The Oriental Pearl" being "9F of Arts and Crafts Building, 31, Beijing East Road, Xuanwu District, Shanghai City", said great error occurs due to existence of the attraction "The Oriental Pearl" if the quoting frequency of the landmark name "The Oriental Pearl" is selected. On the contrary, the address corresponding to the landmark data is usually unique, thus it is quite objective to use the address quoting frequency as the characterized parameter of the publicity in this step.

In step S530, the objective level category of each of the plurality of landmark data is searched. In the present embodiment, the objective level category can be an accepted attractions rating (e.g., Class 1A to Class 5A) or an accepted stores rating (e.g., One Star to Six Star). For instance, the attraction "Shanghai Wild Animal Park" being "Class 3A", the attraction "Hukou Waterfall" being "Class 4A", the shop "Hukou Waterfall grand hotel" being "Three Star", and the shop "South Beauty Restaurant" being "Two Star" cane be searched by the server 103. In the present embodiment, the objective level category can also have a hierarchical distinction property. For instance, "South Beauty Industry" and "South Bride Media" both have the property of "Shop", and "Beijing Hualian Hypermarket" has the property of "Market"; road "217" has the property of "National Highway", "373" has the property of "Province Highway", and "048" has the property of "Country Highway". The objective level category as described above can have different other objective definitions, but the invention is not limited thereto.

In step S540, the publicity of each of the plurality of landmark data is calculated based on the objective level category of each of the plurality of landmark data and the address quoting frequency. In the present embodiment, as the address quoting frequency gets higher, the publicity corresponding to the landmark data that is calculated by the server 103 can also be higher. For instance, the address quoting frequencies of the shops "South Beauty Decoration"

and "South Beauty Industry" are "293" and "531" respectively, thus the publicity corresponding to "South Beauty Industry" is calculated to be greater than that of "South Beauty Decoration". In the present embodiment, as a level of the objective level category gets higher, the publicity corresponding to the landmark data calculated by the server 103 can also be higher. For instance, "Beijing Hualian Hypermarket" and "McDonald's" both have both of their addresses being "5F, No. 515 of East Tower Sichuan Building, 1 Fu Wai Avenue, Xicheng District, Beijing City" and both of their address quoting frequencies being "5236", since "Beijing Hualian Hypermarket" has the property of "Market" while "McDonald's" has the property of "Shop", the publicity of "Beijing Hualian Hypermarket" being calculated can be greater than that of "McDonald's". Similarly, in case of roads, the publicity of "217 National Highway" can be greater than that of "373 Province Highway" and "048 Country Highway".

In step S550, the landmark data are displayed on the electronic device 101 based on the publicity of each of the plurality of landmark data. For instance, after the landmark data and the corresponding publicity are calculated by the server 103, a result thereof can be transmitted back to the electronic device 101, so that the electronic device 101 can display the landmark data based on priorities in the sorting order of the publicity.

In another embodiment of the invention, steps S510 to S550 can all be executed in the electronic device 101; or, with a communication and cooperation via the Internet, a part of steps S510 to S550 can be executed in the electronic device 101 while other parts of said steps can be executed in the server 103, and the invention is not particularly limited thereto.

Figure 6:
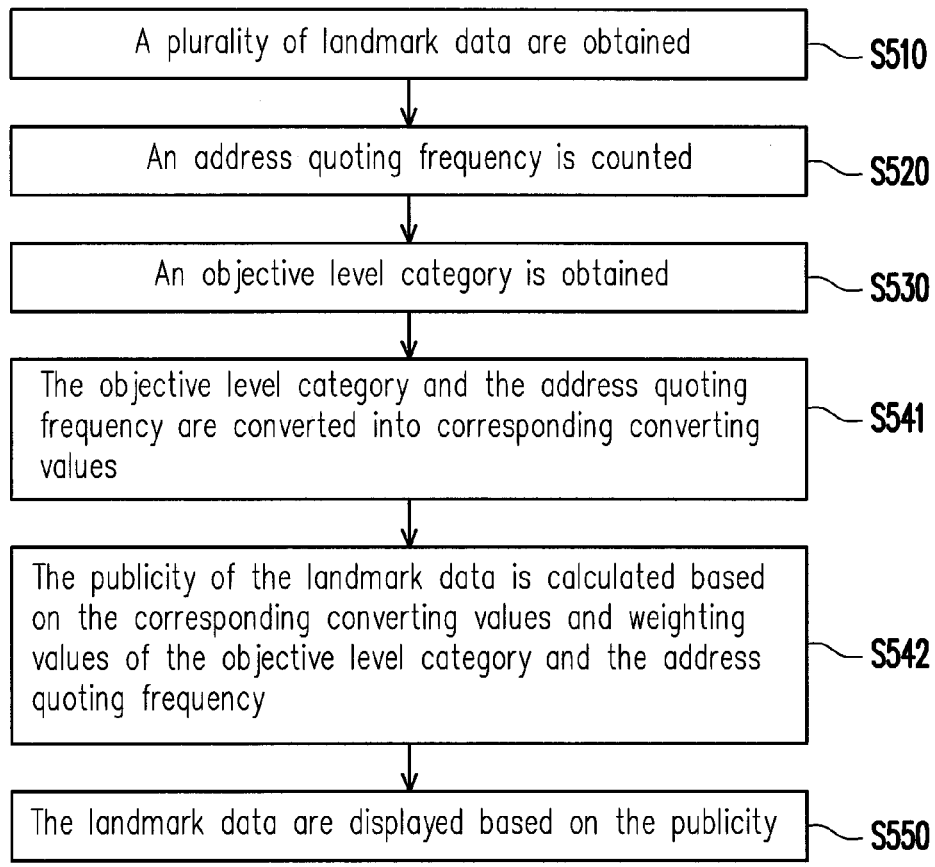
FIG. 6 is a flowchart illustrating a display method of landmark data according to another embodiment of the invention.

FIG. 6 is a flowchart of a display method of landmark data according to an embodiment of the invention. As shown in FIG. 6, the display method of landmark data according to an embodiment of the invention includes steps S510 to S530, S541, S542 and S550. A difference between the present embodiment and the forgoing embodiment is described in detail below. When calculating the publicity of the landmark data, steps S541 and S542 can be further executed as shown below.

In step S541, the objective level category of each of the plurality of landmark data and the address quoting frequency are converted into corresponding converting values. For instance, in the embodiments of the invention, in case the objective level category is the accepted attractions rating, the corresponding converting values of "Class 1A", "Class 2A", "Class 3A", "Class 4A" and "Class 5A" can be 20, 40, 60, 80 and 100, respectively; in case the objective level category is the accepted attractions rating, the corresponding converting values of "One Star", "Two Star", "Three Star", "Four Star", "Five Star" and "Six Star" can be 20, 40, 60, 80, 100 and 120, respectively. In case the objective level category have the hierarchical distinction property, the corresponding converting values of "Shop" and "Market" can be 20 and 80, respectively; and the corresponding converting values of "National Highway", "Province Highway" and "Country Highway" can be 30, 60 and 90, respectively. In the present embodiment of the invention, the corresponding converting values of the address quoting frequency can be calculated by using a natural logarithm of (ln x)×10. For instance, when the address quoting frequency of "Class 4A" attraction "The Oriental Pearl" is 852318 times, the corresponding converting value can be (ln 852318)×10=136.56; and if the address is not provided, the corresponding converting value can be 0. The corresponding converting values and method for calculating the corresponding converting values can be adjusted and changed according to various conditions, and the invention is not limited thereto.

In step S542, the publicity of the landmark data is calculated based on the corresponding converting values and weighting values of the objective level category and the address quoting frequency. In the embodiments of the invention, the weighting value corresponding to the objective level category can be 0.4, and the weighting value corresponding to the address quoting frequency can be 0.6, so that a function for calculating the publicity of the landmark data can be: (the converting value of the objective level category)×0.4+(the converting value of the address quoting frequency)×0.6. For instance, the publicity of "Class 4A" attraction "The Oriental Pearl" can be (80)×0.4+((ln 852318)×10)×0.6=113.94, and the publicity of "South Beauty Industry" with the property of "Shop" is (20)×0.4+((ln 531)×10)×0.6=45.66.

As described above, when the landmark database in the electronic device 101 or the server 103 is constructed, the user can perform search for the specific landmark. Detailed description thereof is provided as below.

Figure 7:
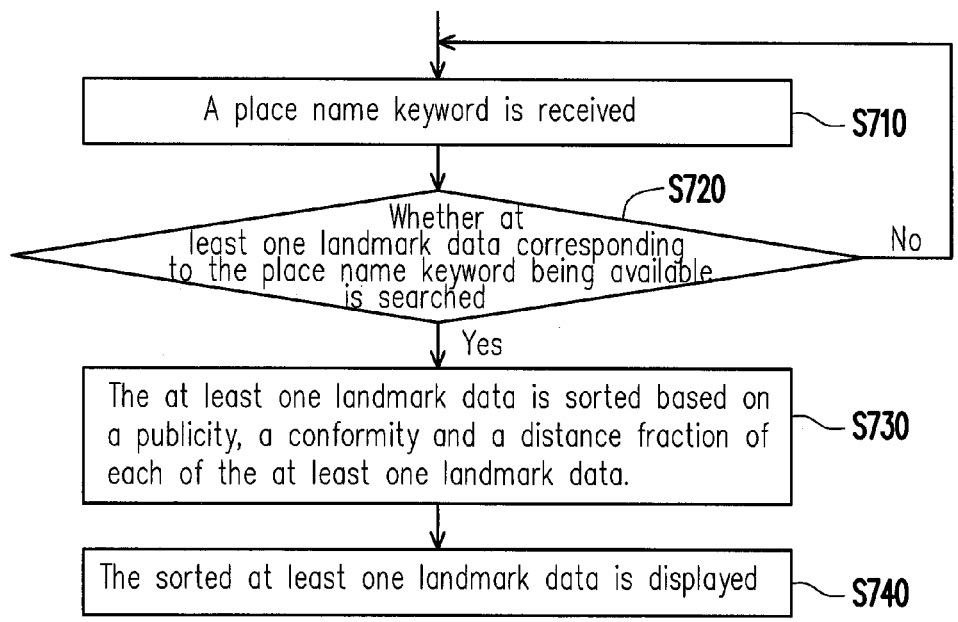
FIG. 7 is a flowchart illustrating a display method of landmark data according to another embodiment of the invention.

FIG. 7 is a flowchart of a display method of landmark data according to an embodiment of the invention. As shown in FIG. 7, the display method of landmark data according to an embodiment of the invention includes steps S710 to S740.

In step S710, a place name keyword is received. For instance, when the user intends to search the specific landmark, the place name keyword can be input by electronic device 101 vocally or manually.

In step S720, whether at least one landmark data corresponding to the place name keyword being available is searched. For instance, the electronic device 101 can search whether the landmark data are found by using the built-in landmark database, or transmitting ring the place name keyword to the server 103 for searching whether the related landmark data are available. Proceeding to step S730 if the related landmark data are found, otherwise, wait for another on of the place name keyword to be received.

In step S730, if the at least one landmark data is searched, the at least one landmark data is sorted based on a publicity, a conformity and a distance fraction of each of the at least one landmark data. For instance, when it comes to search the related landmark data, a large number of possible landmark data can be found. Accordingly, in consideration of general senses or cognitive habits for the user, the landmark data can be sorted by using the corresponding characterized parameters, so as to save time and effort spent by the user in the search. In the present embodiment, besides the publicity (which is related to the objective level category and the address quoting frequency counted on the Internet), the characterized parameter corresponding to the landmark data can further include a conformity (e.g., a conformity of text) and a distance fraction (e.g., a distance degree between the landmark and the user) of the landmark data. However, in another embodiment of the invention, the characterized parameter corresponding to the landmark data can be one among the publicity, the conformity and the distance fraction, but the invention is not limited thereto.

In step S740, the sorted at least one landmark data is displayed on the electronic device 101. In this case, the user can inquire for a best result of the landmark data from the plurality of sorted landmark data by inputting the place name keyword to the electronic device 101.

Figure 8:
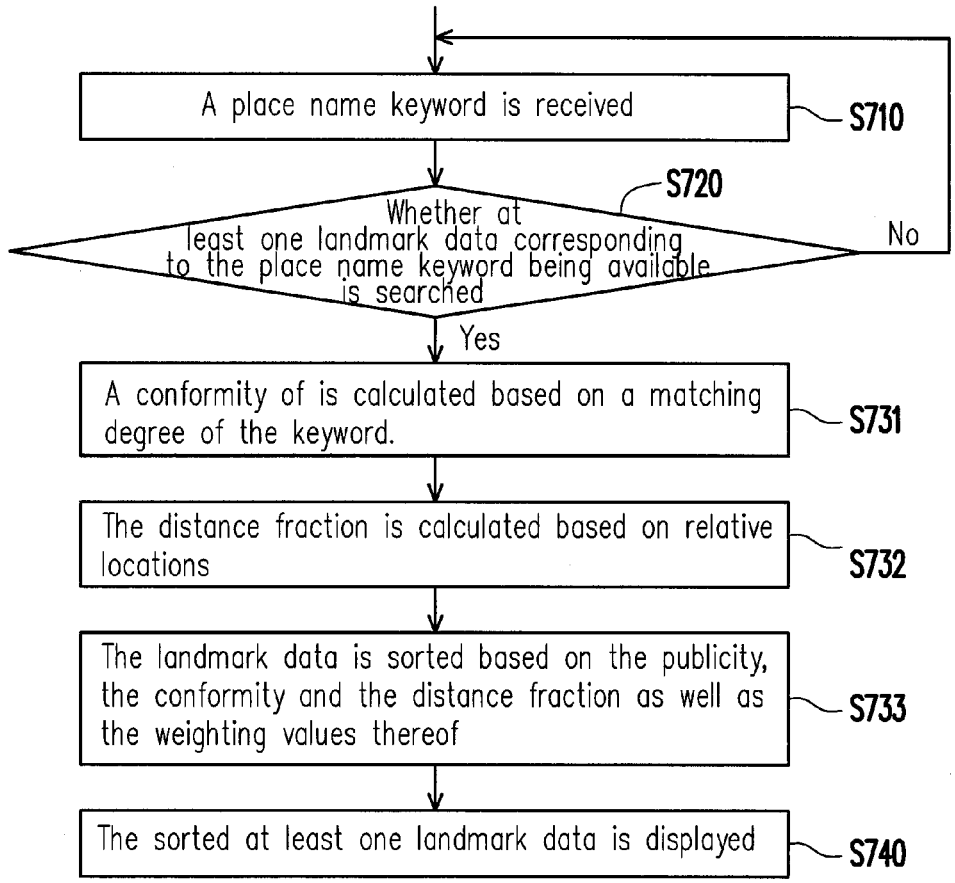
FIG. 8 is a flowchart illustrating a display method of landmark data according to another embodiment of the invention.

FIG. 8 is a flowchart of a display method of landmark data according to another embodiment of the invention. As shown in FIG. 8, the display method of landmark data according to an embodiment of the invention includes steps S710, S720, S731 to S733, and S740. A difference between the present embodiment and the forgoing embodiment is described in detail below. When sorting the searched landmark data corresponding to the landmark data, steps S731 to S733 can be further executed as shown below.

In step S731, the conformity of each of the at least one landmark data is calculated based on a landmark name of each of the at least one landmark data and the place name keyword. In other words, the conformity is calculated based on a matching degree of searched landmark data to the place name keyword. For instance, in case the place name keyword input by the user is "South Beauty", the conformities of "South Beauty Restaurant", "South Beauty Decoration" and "South Beauty Industry" are all higher than a conformity of "South Bride Media".

In step S732, the distance fraction of each of the at least one landmark data is calculated based on a location of each of the at least one landmark data and a location of the electronic device 101. In other words, the distance fraction is calculated based on relative locations of landmark data to the electronic device 101. For instance, in case the place name keyword input by the user is "South Beauty", the distance fractions of "South Beauty Restaurant" and "South Beauty Decoration" are all higher than a distance fraction of "South Beauty Industry".

In step S733, the at least one landmark data is sorted based on the publicity, the conformity and the distance fraction as well as the weighting values thereof. For instance, based on different requirements, the electronic device 101 can define the weighting values corresponding to the publicity, the conformity and the distance fraction, so as to decide an influence degree of each of the publicity, the conformity and the distance fraction, to the sorting result.

Accordingly, when the user inquires for the specific landmark, a searching result displayed by the characterized landmark data is sorted according to general senses or cognitive habits of the user, time and effort spent by the user when searching can be saved.

In view of above, in the invention, the publicity is calculated by using the converting value and weighting value corresponding to the address quoting frequency and the objective level category of each of the plurality of landmark data. After the place name keyword is received, the conformity is calculated based on the matching degree of searched landmark data to the place name keyword. A distance fraction is calculated based on the relative locations of landmark data and the electronic device. The searched landmark data is sorted based on the publicity, the conformity and the distance fraction, so that the sorted landmark data can be displayed on the electronic device.

Another technical view point is provided below, and served to describe operations between the electronic device 101 and the server 103. As shown in FIG. 1, in another embodiment of the invention, the electronic device 101 and the server 103 can also be used to execute a region labeling method of data documents. Further, in the present embodiment, a region labeling device 900 is utilized as the electronic device 101 for example. In other words, the electronic device 101 and the region labeling device 900 can be devices which are substantially equivalent and interchangeable to each other.

The user can use the region labeling device 900 to communicated with the server 103 via the Internet, so as to obtain a data document or reference information configured to label the data document. In the present embodiment of the invention, the data document can be a network news. For instance, first, when a large amount of network news are obtained by a network news editor, the network news is regionally classified and labeled. In the present embodiment, the network news editor can use the region labeling device 900 to obtain the reference information with regional names from the server 103, so as to construct a specific tree structure for analyzing and labeling a content property of the network news. In another embodiment of the invention, the network news editor can use the region labeling device 900 to directly obtain the constructed specific tree structure from the server 103. Each node in said tree structure represents each of the specific regional name, and the tree structure can be used to obtain all administrative area names in all hierarchies on each of the specific regional name. The regional name can include an administrative area name and an iconic name, and a node of the iconic name can be located at a lowest hierarchy of the tree structure. The iconic name can be a place name or an attraction name, or any regional personal names, social organization name or other names, but the invention is not limited thereto. Accordingly, for instance, a region of any attractions or social organizations in the tree structure (i.e., each of father nodes) can then be obtained. Subsequently, the region labeling device 900 can analyze whether the network news includes a regional content (e.g., the place name keyword). If the regional content is matched to any one of the nodes in the tree structure, the region labeling device 900 can label such network news as the matched node. In other words, the network news editor can make the network news having the regional content to have a corresponding characteristics by using the region labeling device 900, so as to complete the labeling or regional classifying of the each of the network news, (e.g., to which regional category does the network news belong to). Detailed description thereof is further provided as below.

Figure 9:
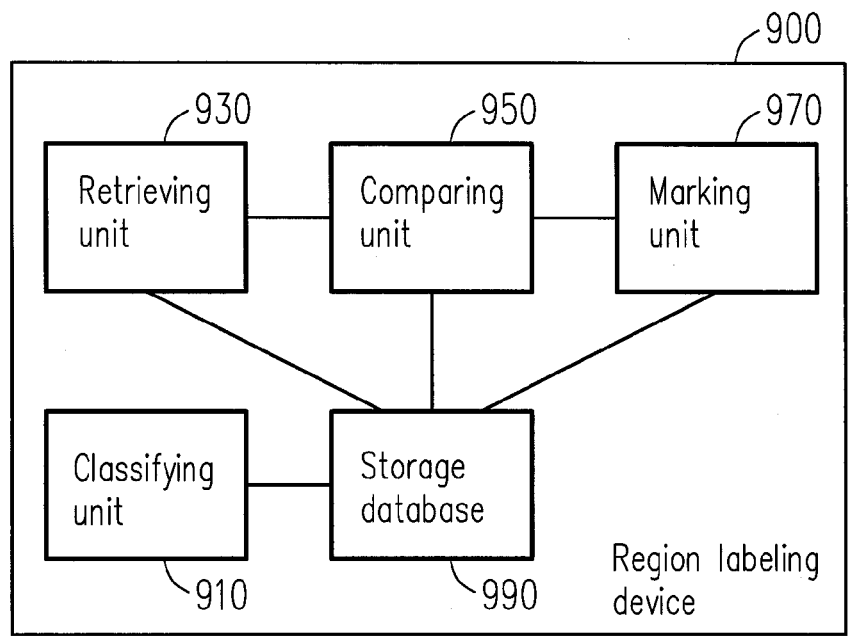
FIG. 9 is a block diagram illustrating a region labeling device for data documents according to an embodiment of the invention.
Figure 10:
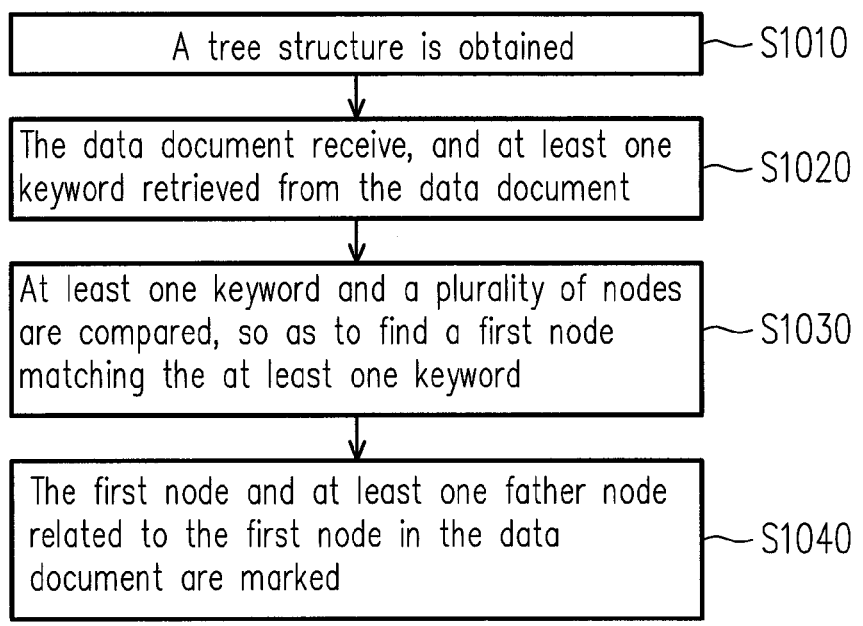
FIG. 10 is a flowchart illustrating a region labeling method of data documents according to an embodiment of the invention.
Figure 11:
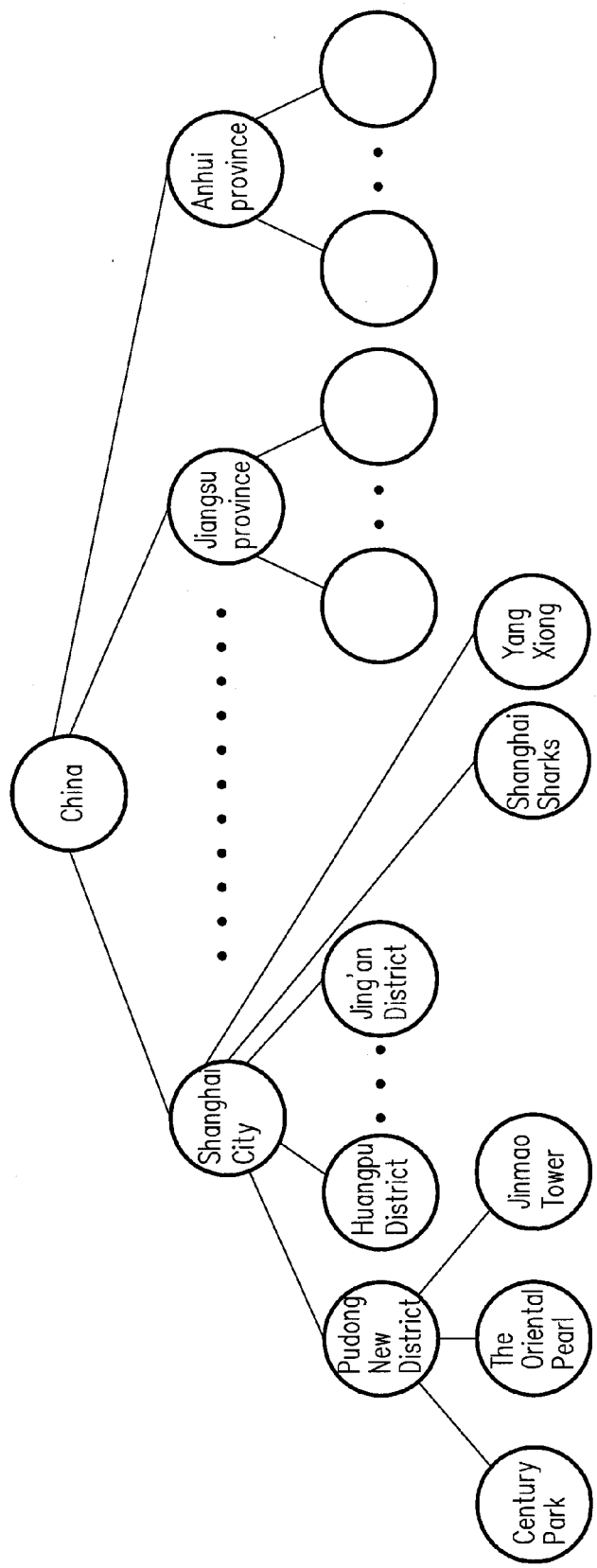
FIG. 11 is a schematic diagram of a tree structure according to an embodiment of the invention.

FIG. 9 is a block diagram of a region labeling device for data documents according to an embodiment of the invention. As shown in FIG. 9, the region labeling device 900 includes a classifying unit 910, a retrieving unit 930, a comparing unit 950, a labeling unit 970 and a storage database 990. The comparing unit 950 is coupled to the retrieving unit 930; the labeling unit 970 is coupled to the comparing unit 950; and the storage database 990 is coupled to the classifying unit 910, the retrieving unit 930, the comparing unit 950 and the labeling unit 970. The classifying unit 910, the retrieving unit 930, the comparing unit 950 and the labeling unit 970 can be functional modules or microprocessors in various types, and the storage database 990 can be a storage medium in various types. FIG. 10 is a flowchart of a region labeling method of data documents according to an embodiment of the invention. As shown in FIG. 10, the region labeling method according to the present embodiment of the invention includes steps S1010 to S1040. FIG. 11 is a schematic diagram of a tree structure according to an embodiment of the invention. The following description refers to FIGS. 9, 10 and 11 together.

In step S1010, the classifying unit 910 can obtain the tree structure via the Internet. In the present embodiment, the tree structure can include a plurality of nodes having a plurality of administrative area names and a plurality of iconic names, and a hierarchical relation is provided between the administrative area names and the iconic names. In addition, the classifying unit 910 can store the obtained tree structure in the storage database 990. For instance, as shown in FIG. 11, each node of the tree structure can include the administrative area in all hierarchies of China and an attraction name thereof. A relation between upper nodes and lower nodes of the tree structure can be corresponded to the hierarchical relation between the administrative area names and the iconic names. For instance, under the node "China", child nodes including each province or each municipality (e.g., Shanghai, Jiangsu province, and Anhui province etc.) are included. Child nodes of districts (e.g., Pudong New District, Huangpu District, Jing'an District, and etc.) are included under the node "Shanghai". Child nodes of the attractions (e.g., Century Park, The Oriental Pearl, Jinmao Tower, and etc.) are included under the node "Pudong New District". In addition, as described above, the iconic names can be the regional personal names and social organization name. As shown in FIG. 11, the node "Shanghai" can further include the child node of the professional basketball team "Shanghai Sharks" and the child node of the mayor of Shanghai "Yang Xiong".

In step S1020, the retrieving unit 930 can receive the data document from the Internet, and retrieve at least one keyword from the data document. For instance, the retrieving unit 930 can receive a large amount of the network news from the server 103 via the Internet, and store the network news to the storage database 990. Contents of the received network news can include various types of regional keywords, such as "Jiangsu province" or "The Oriental Pearl". The retrieving unit 930 can analyze said contents and retrieve said keyword from the contents.

In step S1030, the comparing unit 950 can compare at least one keyword and a plurality of nodes, so as to find a first node matching the at least one keyword. For instance, in the tree structure as described above, the known administrative area in all hierarchies of China and the place names and attraction names therein are all included. When the keyword "The Oriental Pearl" is retrieved from the contents of the network news, a search can be performed to the tree structure, and the first node being "The Oriental Pearl" can then be found. This means that, for the tree structure, the network news containing the keyword "The Oriental Pearl" has a regional characteristic and can be classified. In the present embodiment, the comparing unit 950 can find the matching first node by using various algorithms for the tree structure, but the invention is not limited thereto.

In the step S1040, the labeling unit 970 can label the first node and at least one father node related to the first node in the data document. For instance, in the tree structure, if the first node of the keyword "The Oriental Pearls" is retrieved from the network news, the related father nodes can be "Pudong New District", "Shanghai" and "China". Accordingly, besides that the network news containing the keyword "The Oriental Pearl" is labeled with the first node "The Oriental Pearls", it can also be labeled with the administrative area in all hierarchies on the "The Oriental Pearls", which is the related father nodes of "Pudong New District", "Shanghai" and "China" above the "The Oriental Pearls".

Figure 12:
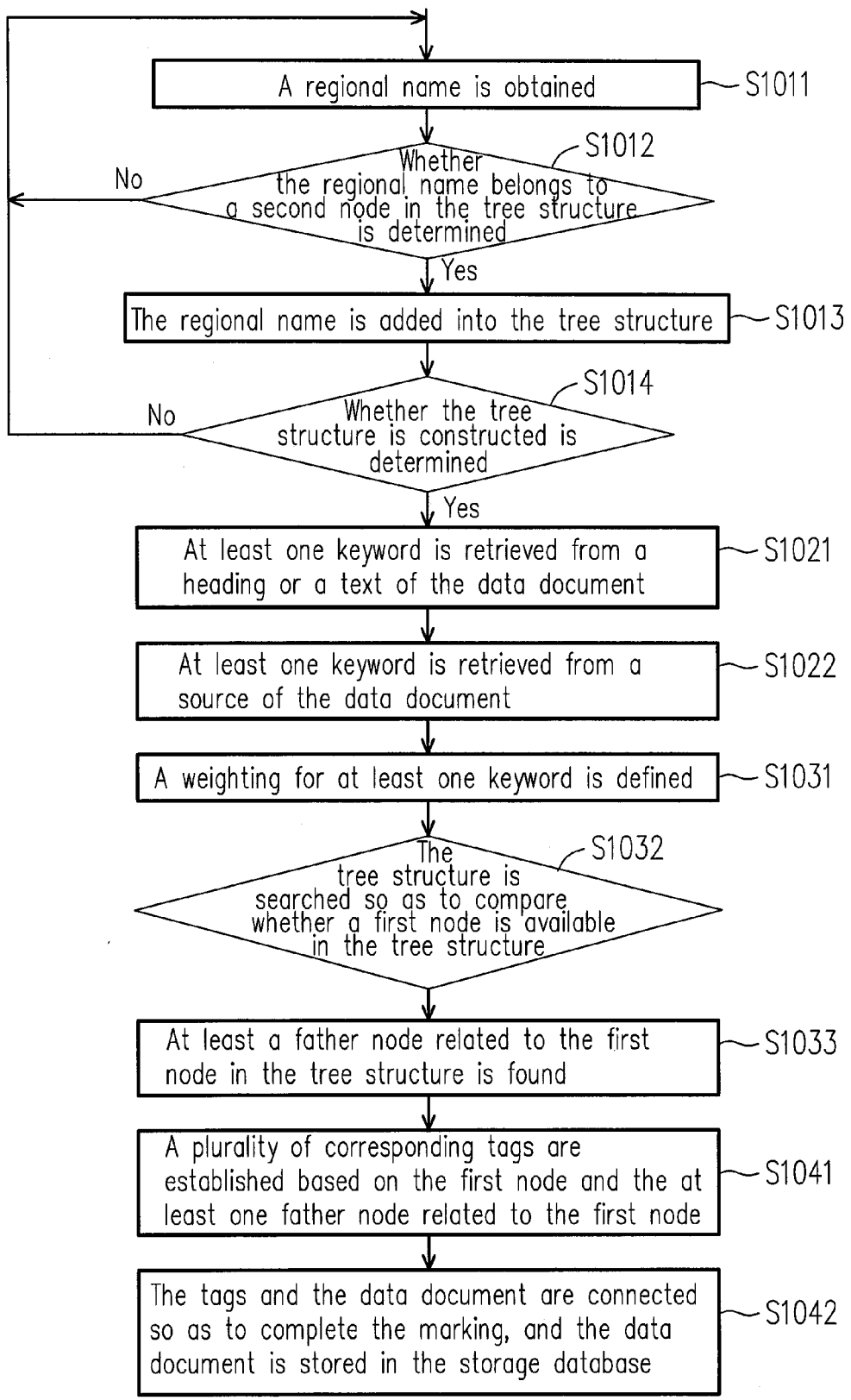
FIG. 12 is a flowchart illustrating a region labeling method of data documents according to another embodiment of the invention.

FIG. 12 is a flowchart of a region labeling method of data documents according to another embodiment of the invention. As shown in FIG. 12, the region labeling method according to the present embodiment of the invention includes steps S1011 to S1013, S1021 to S1022, S1031 to S1033 and S1041 to S1042. FIG. 13A to FIG. 13D are schematic diagrams illustrating a construction process of tree structure according to an embodiment of the invention.

Figure 13A:
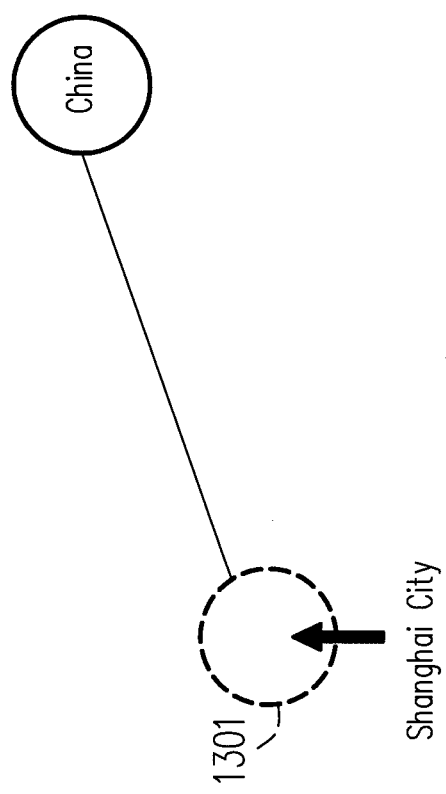
FIG. 13A to FIG. 13D are schematic diagrams illustrating a construction process of tree structure according to an embodiment of the invention.
Figure 13B:
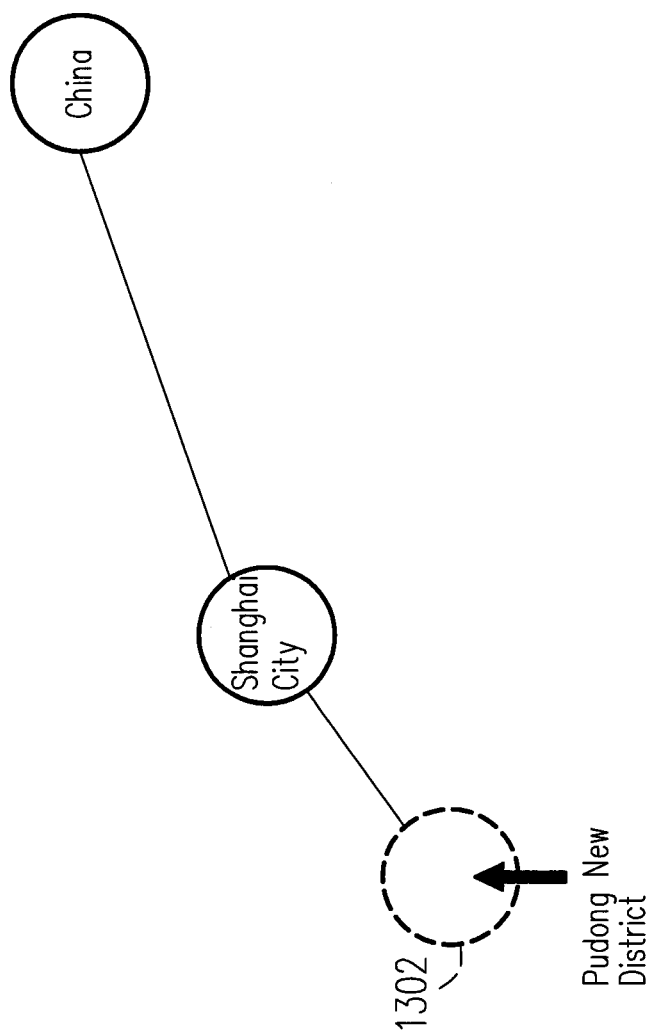

In step S1010, the classifying unit 910 obtains the regional name. For instance, the classifying unit 910 can obtain reference information regarding the administrative area in all hierarchies on China and the place names and attraction names therein, from the server 103 via the Internet. Said reference information can be presented in various readable formats for the classifying unit 910, and the invention is not limited thereto. The classifying unit 910 can obtain each of the regional names according to the reference information. As shown in FIG. 13A, when the tree structure includes the node "China", the classifying unit 910 can obtain the administrative area name being "Shanghai".

In step S1012, the classifying unit 910 determines whether the regional name belongs to a second node in the tree structure. Proceeding to execute step S1013 if a result of such determination by the classifying unit 910 is yes. The second node can be a node of the region where the regional name belongs to the lowest hierarchy in the tree structure. For instance, as shown in FIG. 13A, when the tree structure includes the node "China", the classifying unit 910 can obtain the administrative area name being "Shanghai". In this case, the classifying unit 910 can determine that the administrative area "Shanghai" of second node can be a dashed line node 1301 depicted in FIG. 13A.

In step S1013, the classifying unit 910 can add the regional name into the tree structure. For instance, as shown in FIG. 13A, the classifying unit 910 can then construct, in the tree structure, the node "Shanghai" to correspond to the administrative area name being obtained.

Figure 13C:
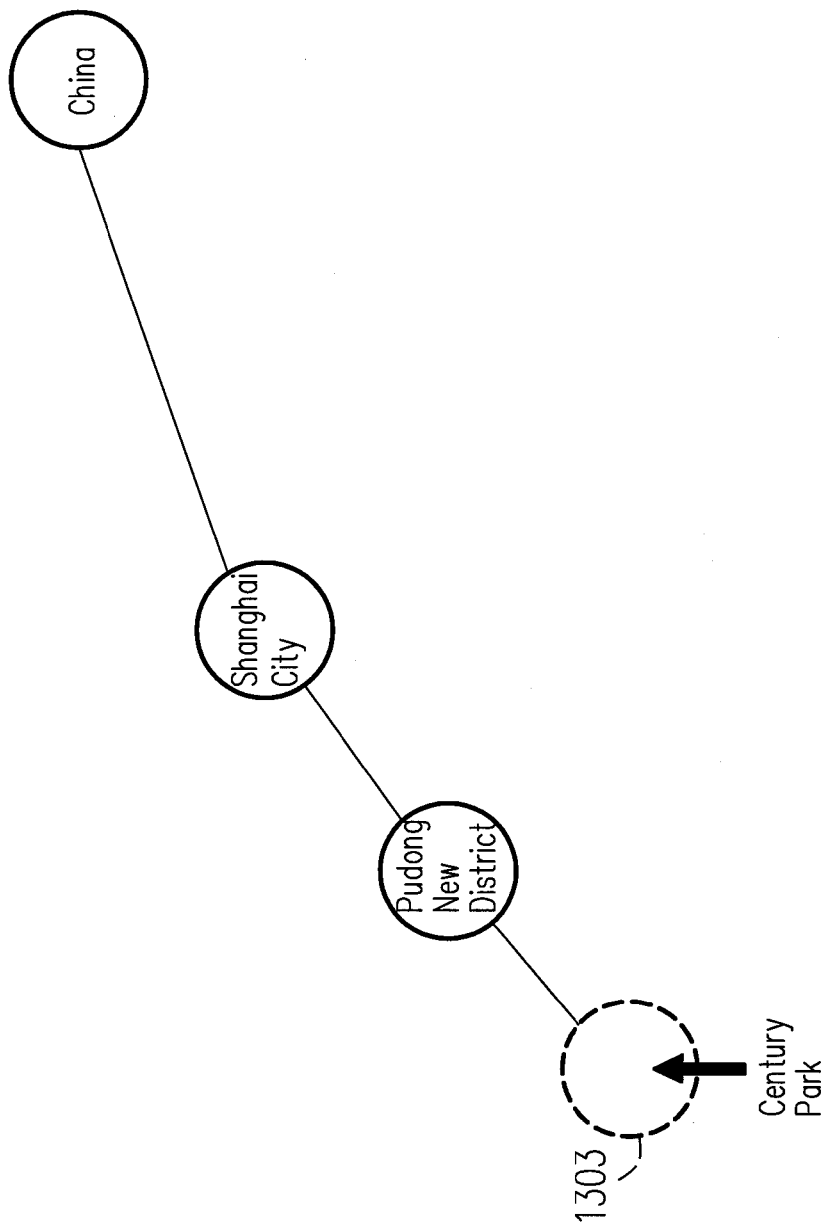
Figure 13D:
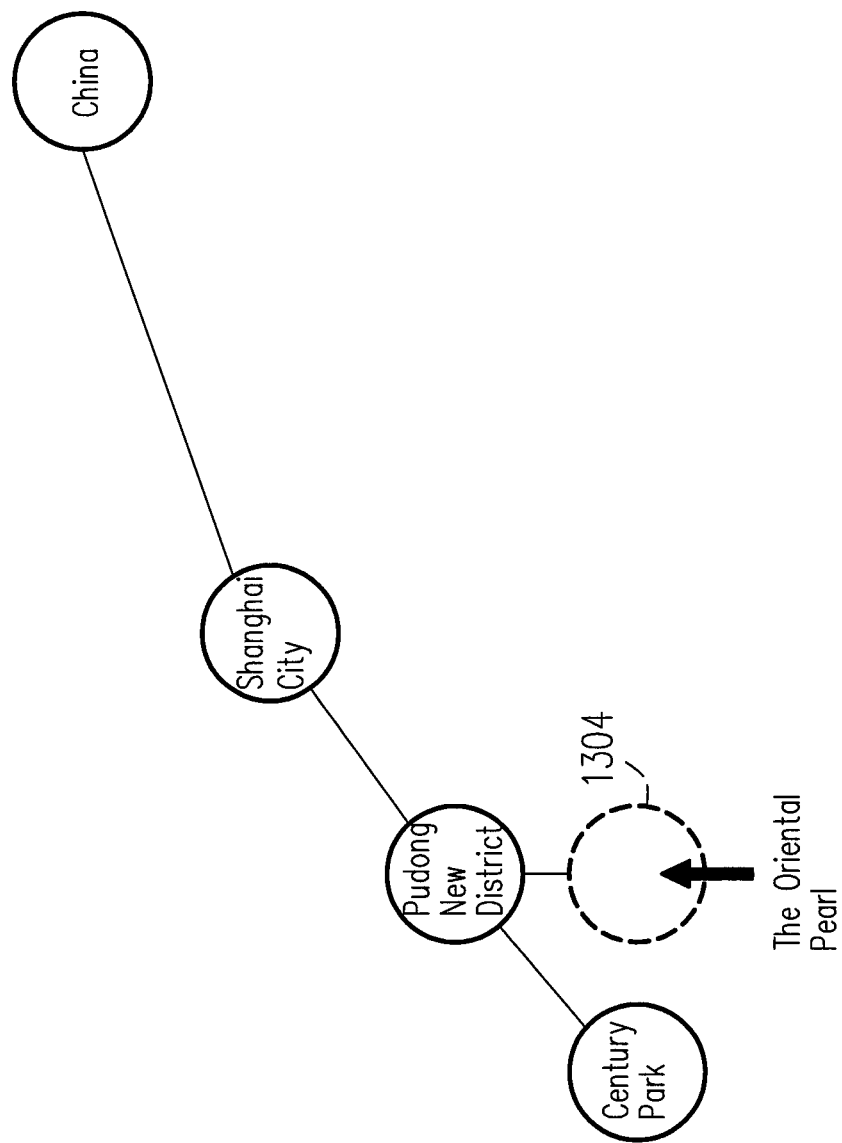

In step S1014, the classifying unit 910 determines whether the tree structure is constructed. Proceeding to execute step S1021 if the tree structure is constructed. Above-said steps S1011 to step S1013 can be repeatedly executed if the tree structure is not yet constructed. For instance, in FIG. 13B, the classifying unit 910 can determine and add a dashed line node 1302 that is the administrative area "Pudong New District" of the second node. In FIG. 13C, the classifying unit 910 can determine and add a dashed line node 1303 that is the attraction name "Century Park" of the second node. In FIG. 13D, the classifying unit 910 can determine and add a dashed line node 1304 that is the attraction name "The Oriental Pearl" of the second node. Repeating above processes until the classifying unit 910 has constructed each node in the tree structure with the reference information regarding the administrative area in all hierarchies on China and the place names and attraction names therein, as shown in FIG. 11. The construction of above tree structure can be accomplished by using algorithms related to various tree structures, and the invention is not limited thereto. As described above, in FIG. 11, when the tree structure is constructed, each node of the tree structure is included with the administrative area in all hierarchies on China and the place names and attraction names therein, and the relation between upper nodes and lower nodes of the tree structure can be corresponded to the hierarchical relation between the administrative area names and the iconic names.

In step S1021, the retrieving unit 930 retrieves at east one keyword from a heading or a text of the data document. For instance, the content of the network news can include the heading content or the text content, thus the retrieving unit 930 can retrieve the keyword from the heading content and the content, so that the keyword can be used to determining the regional characteristic of the network news.

In step S1022, the retrieving unit 930 retrieves at east one keyword from a source of the data document. In the present embodiment, the source of the data document can include a place of occurrence related to the data document and a location of a provider of the data document. For instance, since that the heading and the text of the network news may not include the regional keyword, the retrieving unit 930 can further retrieve the keyword from the place of occurrence related to the network news. For instance, if the network news is released in a field "Huangpu District Local News"

of a specific portal website, the retrieve unit 930 can then retrieve the keyword "Huangpu District". Alternatively, the retrieving unit 930 can further retrieve the keyword from the location of the provider of the network news. For instance, if the network news is released by a newspaper office "Shanghai Daily", the retrieving unit 930 can then retrieve the keyword "Shanghai". Alternatively, if the network news is released by a newspaper office "Xinmin Evening News", and the location of the newspaper office "Xinmin Evening is Shanghai, the retrieving unit 930 can still obtain the keyword "Shanghai" by a lookup table or according to related information.

In step S1031, the comparing unit 950 respectively defines a weighting for at least one keyword. The weighting can refer to an influence degree of the keyword to the regional characteristic of the data document. In other words, when the weighting corresponding to the keyword is higher, a possibility that the comparing unit 950 use such keyword to determine the regional characteristic of the data document is also higher. For instance, as described above, the keyword corresponding to the network news can be obtained from the text and heading of the network news, or according to the place of occurrence related and the location of the provider, and the keyword obtained from different places can correspond to different weightings. For instance, the weighting of the keyword retrieved according to the place of occurrence related to the network news is A; the weighting of the keyword retrieved from the heading of the network news is B; the weighting of the keyword retrieved from the text of the network news is C; the weighting of the keyword retrieved according to the location of the provider of the network news is D, such that their relative relations can be A>B>C>D. However, above-said relative relations of the weightings can have other arrangements or modifications, and the invention is not limited thereto.

In step S1032, the comparing unit 950 searches the tree structure so as to compare whether a first node is available in the tree structure, and whether the administrative area names and the iconic name included in the first node is identical to at least one of the at least one keyword. Proceeding to execute step S1033 if the comparing unit 950 determines that the first node is available in the tree structure. As described in step S1031, the weighting can refer to the influence degree of the keyword to the regional characteristic of the data document. Thus, in the present embodiment, the comparing unit 950 can further use the weighting corresponding to the keyword as an order reference in comparing the keyword and the nodes. For instance, as described above, the same network news can include the keyword retrieved according to the place of occurrence related to the network news and the keyword retrieved from the text of the network news at the same time. In this case, the weighting of the keyword retrieved according to the place of occurrence related to the network news can be greater than the keyword retrieved from the text of the network news. Therefore, the comparing unit 950 will first use the weighting of the keyword retrieved according to the place of occurrence related to the network news to search the tree structure. Next, the comparing unit 950 can find the first bode according to a searching algorithm of the tree structure, and the administrative area names and the iconic name included in the first node is identical to the keyword used in for searching. In the present embodiment, the searching algorithm of the tree structure can be accomplished by various applications, and the invention is not limited thereto.

In the step S1033, the comparing unit 950 finds at least a father node related to the first node in the tree structure. Owing to the hierarchy characteristic of the tree structure, the comparing unit 950 is capable of finding each father node from each upper hierarchy of the first node. For instance, as shown in FIG. 11, if the first node is "The Oriental Pearls", the related father nodes are "Pudong New District", "Shanghai" and "China".

In the step S1041, the labeling unit 970 establishes a plurality of corresponding tags based on the first node and the at lest one father node related to the first node. For instance, when the comparing unit 950 found that the first node of the network news has the keyword "The Oriental Pearls", the labeling unit 970 not only can set "The Oriental Pearls" as one of the tags, "Pudong New District", "Shanghai" and "China" can also be set as the tags of the network news. A method of establishing the tags can be completed by recording a name of the related father nodes corresponding to the first node, or retrieving a link of the related father nodes corresponding to the first node, and the invention is not limited thereto.

In step S1042, the labeling unit 970 connects the tags and the data document so as to complete the labeling, and stores the data document in the storage database 990. For instance, when each of the tags "The Oriental Pearls", "Pudong New District", "Shanghai" and "China" of the network news containing the keyword "The Oriental Pearls" are established, the labeling unit 970 connects the tag to the corresponding network news. A method of connecting the tags can be completed by add connects of the name of the related father nodes corresponding to the first node, or attaching the link of the related father nodes corresponding to the first node into the network news, and the invention is not limited thereto.

In summary, in the invention, the tree structure having a plurality of nodes is constructed by adding second nodes corresponding to the regional name, so that the nodes can have the hierarchical relation between the administrative area names and the iconic names. Next, the regional keyword can be obtained based on the heading content, the text content, the place of occurrence related to the data document and the location of the provider of the data document. Later, after the order reference of the keyword and the tree structure are defined according to the weightings of the keywords, the matched first node and its father node is found and used to label the corresponding data document, so that the data document can have the corresponding characteristic.

Another technical view point is provided below, and served to describe operations between the electronic device 101 and the server 103. As shown in FIG. 1, in another embodiment of the invention, the electronic device 101 and the server 103 can also be used to execute a sorting method of data documents.

In the present embodiment of the invention, when the electronic device 101 includes the data document without a current ranking, the data document without the current ranking is uploaded to the server 103 for content analysis. Next, a predicting ranking of the data document without the current ranking is generated and sorted based on a sort algorithm. Lastly, a result thereof is transmitted back to the electronic device 101. In the embodiments of the invention, if the predicting ranking of the data document without the current ranking is in top 100, such data document is deemed as "important". If the predicting ranking of the data document without the current ranking is not in top 100, such data document is deemed as "not important". In the present embodiment of the invention, before the data document without a current ranking is received by the server 103, the server 103 can generate the sort algorithm based on the data documents with the current ranking. In another embodiment of the invention, the electronic device 101 can generate the sort algorithm based on the data documents with the current ranking. Therefore, the predicting ranking of the data document without the current ranking can be obtained by the server 103 without going through the server 103. Details of generating the sort algorithm and the predicting ranking of the data document are described below.

Figure 14:
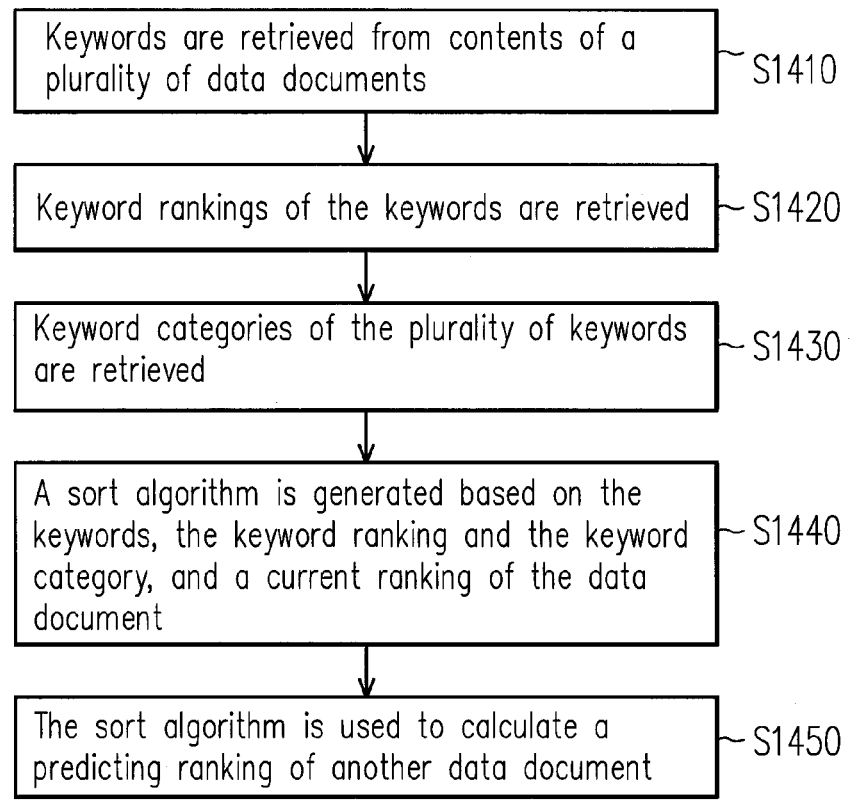
FIG. 14 is a flowchart illustrating a sorting method of data documents according to an embodiment of the invention.

FIG. 14 is a flowchart of a sorting method of data documents according to an embodiment of the invention. As shown in FIG. 14, the sorting method of data document according to an embodiment of the invention includes steps S1410 to S1450. Table 2 is a schematic diagram of the data document with the current ranking according to an embodiment of the invention. Table 3 is a schematic diagram of the data document without the current ranking according to an embodiment of the invention. In the present embodiment of the invention, the data document can be the news document. As shown in Table 2 and Table 3, the contents of the data document can further include a heading content and a text content. The following description refers to FIG. 14, Table 2 and Table 3 together.

TABLE 2

| Data Document | | Keyword | Keyword Ranking | Keyword Category | Current Ranking |
|---|---|---|---|---|---|
| 1 | Heading Content | The Two Meetings | 152 | Political Meeting | 25 |
|   | Text Content | National People's Congress | 96 | Political Meeting | |
|   |   | CPPCC Session | 135 | Political Meeting | |
|   |   | Xi Jinping | 33 | Politicians | |
|   |   | Hu Jintao | 47 | Politicians | |
|   |   | Two Sides of the Strait | 95 | International Relations | |
| 2 | Heading Content | iPhone 5 | 21 | Smart Phone | 38 |
|   |   | Apple | 57 | Technology Company | |
|   | Text Content | Jobs | 42 | Technology Figure | |
|   |   | Cook | 108 | Technology Figure | |
|   |   | America | 317 | Nation | |
|   |   | Samsung | 96 | Technology Company | |
| 3 | Heading Content | I am a singer | 17 | TV Program | 67 |
|   | Text Content | Terry Lin | 53 | Singer | |
|   |   | Huang Qishans | 66 | Singer | |
| 4 | Heading Content | Heat | 139 | Team | 184 |
|   | Text Content | James | 87 | Player | |
|   |   | Miami | 106 | City | |
|   |   | Anthony | 127 | Player | |

TABLE 3

| Data Document | | Keyword | Keyword Ranking | Keyword Category | Predicting Ranking |
|---|---|---|---|---|---|
| 5 | Heading Content | Kai-fu Lee | 262 | Technology Figure | 360 |
|   | Text Content | Innovation Works | 396 | Venture Capital Firm | |
|   |   | Microsoft | 137 | Technology Company | |
|   |   | Google | 192 | Technology Company | |

In step S1410, a plurality of keywords are retrieved from contents of a plurality of data documents. For instance, the keywords can be retrieved from the contents of data documents 1 to 4, respectively. For instance, the keyword "The Two Meetings" can be retrieved from a heading content of the data document 1, and the keywords "National People's Congress", "CPPCC Session", "Xi Jinping", "Hu Jintao" and "Two Sides of the Strait" can be retrieved from a text content of the data document 1.

In step S1420, corresponding keyword rankings of the plurality of keywords are retrieved by the search engine. For instance, the keyword rankings corresponding the keywords "National People's Congress", "CPPCC Session", "Xi Jinping", "Hu Jintao" and "Two Sides of the Strait" retrieved by the search engine can be "152", "96", "135", "33", "47" and "95", respectively. In the present embodiment, the keyword rankings can be keyword rankings of current date, current week or current month which are retrieved by Google search engine, but the invention is not limited thereto.

In step S1430, corresponding keyword categories of the plurality of keywords are retrieved. For instance, the keyword rankings corresponding the keywords "National People's Congress", "CPPCC Session", "Xi Jinping", "Hu Jintao" and "Two Sides of the Strait" retrieved can be "Political Meeting", "Political Meeting", "Political Meeting", "Politicians", "Politicians" and "International Relations", respectively. In the present embodiment of the invention, the corresponding keyword category can be searched by using an encyclopedia database (e.g., Wiki encyclopedia) or other databases having classification mechanisms, but the invention is not limited thereto.

In step S1440, a sort algorithm is generated based on the plurality of keywords, the keyword ranking and the keyword category of each of the plurality of keywords, and a current ranking of each of the plurality of data documents. For instance, in view of the data documents 1 to 4 in Table 2, the sort algorithm for predicting a predicting ranking of another data document can be generated from the keyword, the keyword ranking and the keyword category of the keyword, and the current ranking (25, 38, 67 and 184) of each of the data documents 1 to 4. In the present embodiment of the invention, the sort algorithm can be generated by setting the keywords, the keyword ranking and the keyword category of each of the plurality of keywords as an input of the sort algorithm and setting the current ranking of each of the plurality of data documents as an output of the sort algorithm. The keyword ranking of the keyword included in the data document is related to the current ranking of such data document. Thus, in case a sufficient amount of data documents are available, the sort algorithm corresponding to such relation can then be generated. In addition, the keyword category can be corresponding to the weighting value of the keyword. In other words, the keyword category of the keyword can be used to determine the influence degree of the keyword to the current ranking of the data document. In the present embodiment, a category weighting parameter of the keyword category and a ranking weighting parameter of the keyword ranking can be predefined when generating the sort algorithm. Next, the category weighting parameter and the ranking weighting parameter are adjusted and changed through a large number of test results until input values and output values of the sort algorithm falls in a tolerable range for accuracy. In another embodiment of the invention, a curve fitting method can be utilized to calculate a simulation function (e.g., an analytic function) passing or substantially passing a data point (e.g., the input values and the output values of the sort algorithm) of a finite sequence when generating the sort algorithm. The curve fitting method can be a least square method, but the invention is not limited thereto.

In step S1450, the sort algorithm is used to calculate a predicting ranking of another data document. For instance, it is assumed that a data document 5 is without the current ranking, when the sort algorithm is obtained based on the data documents 1 to 4, the keyword of the data document 5 can be retrieved so that the keyword ranking and the keyword category of the keyword of data document 5 can be inquired and input to the sort algorithm. As a result, the predicting ranking of the data document 5 is calculated as being 360 so that the data document 5 can be sorted accordingly.

As described above, in the present embodiment of the invention, the electronic device 101 can transmit the data document without the current ranking to the server 103. Next, in the server 103, the sort algorithm can be generated by executing steps S1410 to S1440, and the predicting ranking of the data document 5 can be generated and sorted by executing step S1450. Lastly, a result thereof is transmitted back to the electronic device 101. In another embodiment of the invention, steps S1410 to S1450 can all be executed in the electronic device 101, and the invention is not limited thereto.

Figure 15:
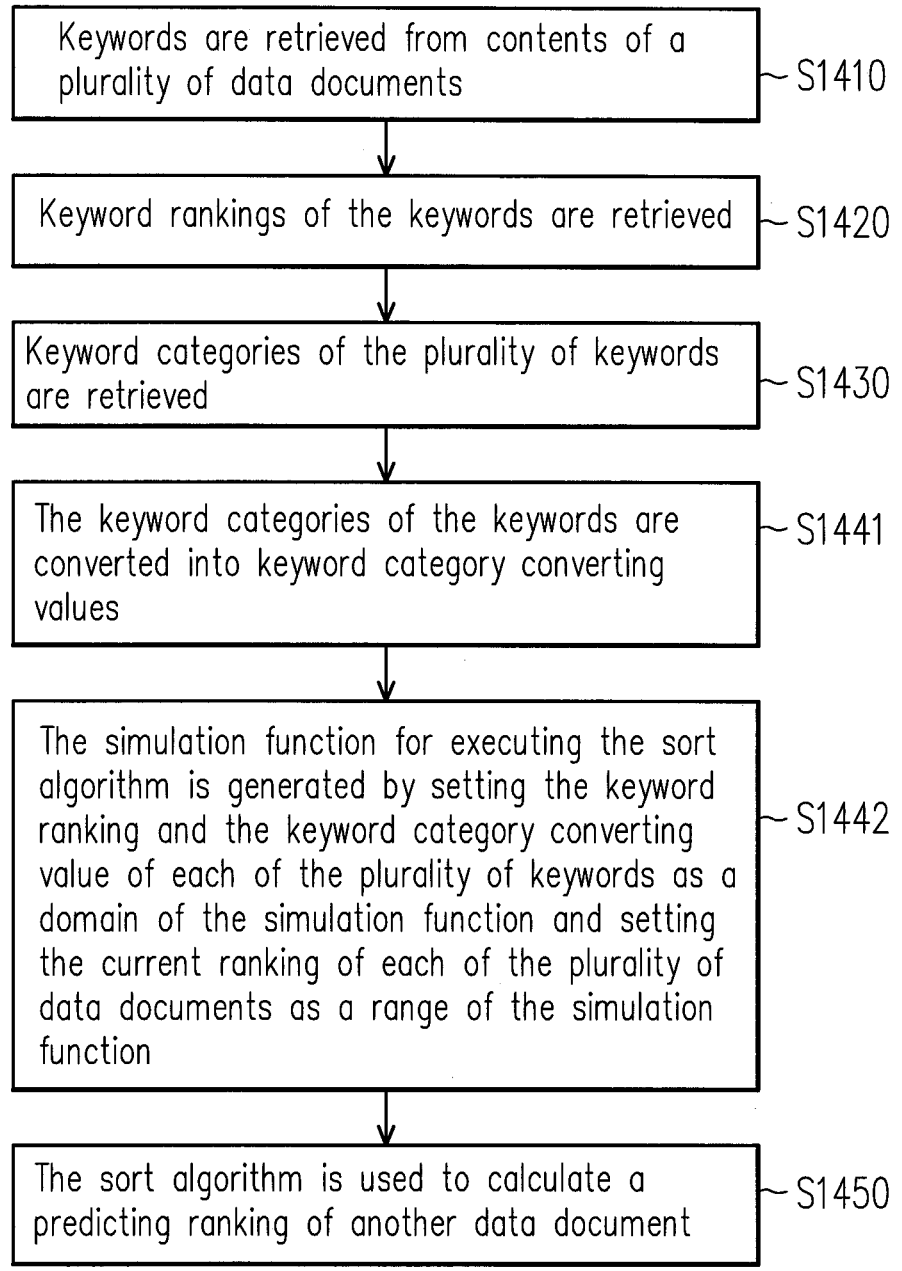
FIG. 15 is a flowchart illustrating a sorting method of data documents according to an embodiment of the invention.

FIG. 15 is a flowchart of a sorting method of data documents according to an embodiment of the invention. As shown in FIG. 15, the sorting method of data document according to an embodiment of the invention includes steps S1410 to S1430, S1441, S1442 and S1450. A difference between the present embodiment and the forgoing embodiment is described in detail below. In the present embodiment of the invention, steps S1441 and S1442 can be further executed to generate the sort algorithm.

In step S1441, the keyword categories of the plurality of keywords are converted into a plurality of keyword category converting values. For instance, the keyword categories "Political Meeting", "Politicians" and "International Relations" of the data document 1 can be respectively changed into the keyword category converting values 10, 20 and 30 by the lookup table or according to a specific function. The keyword categories "Smart Phone", "Technology Company", "Technology Figure" and "Nation" of the data document 2 can be respectively changed into the keyword category converting values 40, 50, 60 and 70. The keyword categories "TV Program", "Singer", "Technology Figure" and "Nation" of the data document 3 can be respectively changed into the keyword category converting values 80 and 90. The keyword categories "Team", "Player" and "City" of the data document 4 can be respectively changed into the keyword category converting values 100, 110 and 120. The keyword category converting values as listed above are merely illustrated as example, and the invention is not limited thereto.

In step S1442, the simulation function for executing the sort algorithm is generated by setting the keyword ranking and the keyword category converting value of each of the plurality of keywords as a domain of the simulation function and setting the current ranking of each of the plurality of data documents as a range of the simulation function. For instance, if variables corresponding to the keyword ranking are $x_0, x_1, x_2, X_3, X_4$ and $x_5$; variables corresponding to the keyword category are $y_0, y_1, y_2, y_3, y_4$ and $y_5$; and the simulation function is $f(x_0, x_1, x_2, x_3, x_4, x_5, y_0, y_1, y_2, y_3, y_4, y_5)$. In this case, referring to the data documents in Table 1, for the simulation $f(x_0, x_1, x_2, x_3, x_4, x_5, y_0, y_1, y_2, y_3, y_4, y_5)$, the domain of $x_0$ including 152, 21, 17 and 139; the domain of $x_1$ including 96, 57, 53 and 87; the domain of $x_2$ including 135, 42, 66 and 106; the domain of $x_3$ including 33, 108, 0 and 127; the domain of $x_4$ including 47, 317, 0 and 0; the domain of $x_5$ including 95, 96, 0 and 0; the domain of $y_0$ including 10, 40, 80 and 100; the domain of $y_1$ including 10, 50, 90 and 110; the domain of $y_2$ including 10, 60, 90 and 120; the domain of $y_3$ including 20, 60, 0 and 120; the domain of $y_4$ including 20, 70, 0 and 0; the domain of $y_5$ including 30, 50, 0 and 0; the range of the simulation function $f(x_0, x_1, x_2, x_3, x_4, x_5, y_0, y_1, y_2, y_3, y_4, y_5)$ including 25, 38, 67 and 184. Next, the simulation function $f(x_0, x_1, x_2, x_3, x_4, x_5, y_0, y_1, y_2, y_3, y_4, y_5)$ can be generated from the large number of test results, or the simulation function $f(x_0, x_1, x_2, x_3, x_4, x_5, y_0, y_1, y_2, y_3, y_4, y_5)$ can be calculated by using the curve fitting method. In the present embodiment of the invention, the simulation function can be one of a linear function and a nonlinear function.

In step S1450, the sort algorithm is used to calculate a predicting ranking of another data document. For instance, as described above, after the function for executing the sort algorithm is generated, the predicting ranking of the data document 5 can then be calculated. For instance, the keyword rankings of the keywords of the data document 5 are retrieved, which are 262, 396, 137 and 192 (respectively corresponding to $x_0, x_1, x_2$ and $x_3$, while $x_4=x_5=0$). Next, the keyword category of the keyword of the data document 5 are retrieved, which are "Technology Figure", "Venture Capital Firm", "Technology Company" and "Technology Company", and their keyword category corresponding values are 60, 130, 50 and 50 (respectively corresponding to $y_0, y_1, y_2$ and $y_3$, and $y_4=y_5=0$). After said keyword category corresponding values are input to the simulation function $f(x_0, x_1, x_2, x_3, x_4, x_5, y_0, y_1, y_2, y_3, y_4, y_5)$ keyword category corresponding values as obtained above, the predicting ranking of the data document 5 being $f(262, 396, 137, 192, 0, 0, 60, 130, 50, 50, 0, 0)=360$ can be obtained, and used for sorting the data document 5.

As described above, in the present embodiment of the invention, the electronic device 101 can transmit the data document without the current ranking to the server 103. Next, in the server 103, the sort algorithm can be generated by executing steps S1410 to S1430, S1441 and S1442 and the predicting ranking of the data document 5 can be generated and sorted by executing step S1450. Lastly, a result thereof is transmitted back to the electronic device 101. In another embodiment of the invention, steps S1410 to S1430, S1441 to S1442, and S1450 can all be executed in the electronic device 101, and the invention is not limited thereto.

In summary, in the invention, by retrieving a plurality of keywords are from contents of a plurality of data documents, setting the keyword ranking and the keyword category converting value of each of the plurality of keywords as a domain of the simulation function and setting the current ranking of each of the plurality of data documents as a range of the simulation function, the simulation function can be generated from the large number of test results based on the category weighting parameter and ranking weighting parameter predefined, or the simulation function can be calculated using the curve fitting method. Lastly, such simulation function is used to execute the sort algorithm so as to calculate a predicting ranking of another data document and to sort the another data document.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A sorting method of data documents, adapted to an electronic device comprising a processor, and the sorting method comprises:
   retrieving, by the processor, a plurality of keywords from contents of a plurality of data documents;
   retrieving, by the processor, keyword rankings corresponding to the plurality of keywords by a search engine, wherein the keyword rankings are ranking information of a plurality of keyword ranking data searched by the search engine corresponding to the plurality of keywords in a predetermined duration;
   searching, by the processor, keyword categories corresponding to the plurality of keywords; and
   generating, by the processor, a sort algorithm based on the plurality of keywords, the keyword ranking and the keyword category of each of the plurality of keywords, and a current ranking of each of the plurality of data documents,
   wherein the sort algorithm is used to calculate a predicting ranking of another data document and to sort the another data document,
   wherein generating the sort algorithm, further comprising:
   generating, by the processor, the sort algorithm by setting the keyword ranking and the keyword category of each of the plurality of keywords as an input of the sort algorithm and setting the current ranking of each of the plurality of data documents as an output of the sort algorithm.

2. The sorting method of claim 1, wherein the sort algorithm is executed by using a simulation function, and the simulation function is one of a linear function and a non-linear function.

3. The sorting method of claim 2, wherein generating the sort algorithm, further comprising:
   generating the simulation function by setting the keyword ranking and the keyword category of each of the plurality of keywords as a domain of the simulation function and setting the current ranking of each of the plurality of data documents as a range of the simulation function.

4. The sorting method of claim 1, wherein the sort algorithm further comprises a ranking weighting parameter and a category weighting parameter, configured to correspond the keyword ranking and the keyword category of each of the plurality of keywords, respectively.

5. The sorting method of claim 1, wherein generating the sort algorithm, further comprising:
   converting the keyword category of each of the plurality of keywords into a plurality of keyword category converting values.

6. The sorting method of claim 1, wherein the contents of the data document further comprise a heading content and a text content.

* * * * *